(12) United States Patent
Suzuki et al.

(10) Patent No.: US 9,372,313 B2
(45) Date of Patent: Jun. 21, 2016

(54) OPTICAL COUPLING MEMBER AND OPTICAL CONNECTOR USING THE SAME, AND OPTICAL COUPLING MEMBER HOLDING MEMBER

(75) Inventors: Hitoshi Suzuki, Yokohama (JP); Naohiko Moriya, Yokohama (JP); Kiyoshi Iwamoto, Tokyo (JP)

(73) Assignee: MITSUBISHI PENCIL COMPANY, LIMITED, Tokyo (JP)

( * ) Notice: Subject to any disclaimer, the term of this patent is extended or adjusted under 35 U.S.C. 154(b) by 153 days.

(21) Appl. No.: 14/347,490

(22) PCT Filed: May 23, 2012

(86) PCT No.: PCT/JP2012/063214
§ 371 (c)(1),
(2), (4) Date: May 28, 2014

(87) PCT Pub. No.: WO2013/046800
PCT Pub. Date: Apr. 4, 2013

(65) Prior Publication Data
US 2014/0270648 A1    Sep. 18, 2014

(30) Foreign Application Priority Data

Sep. 28, 2011 (JP) .................................. 2011-212867
Oct. 18, 2011 (JP) .................................. 2011-229140

(51) Int. Cl.
*G02B 6/42* (2006.01)
*G02B 6/32* (2006.01)

(52) U.S. Cl.
CPC ................ *G02B 6/322* (2013.01); *G02B 6/423* (2013.01); *G02B 6/424* (2013.01); *G02B 6/4204* (2013.01); *G02B 6/4244* (2013.01)

(58) Field of Classification Search
None
See application file for complete search history.

(56) References Cited

U.S. PATENT DOCUMENTS 4,781,431 A * 11/1988 Wesson .................... G02B 6/32
                                                                    385/61
5,968,033 A * 10/1999 Fuller et al. ...................... 606/9
(Continued)

FOREIGN PATENT DOCUMENTS

JP    61-201007 U    12/1986
JP    05-038606 U     5/1993
(Continued)

OTHER PUBLICATIONS

Office Action dated Jun. 23, 2015, issued in counterpart Japanese application No. 2011-229140 (3 pages).
(Continued)

*Primary Examiner* — Tina Wong
(74) *Attorney, Agent, or Firm* — Westerman, Hattori, Daniels & Adrian, LLP

(57) ABSTRACT

An optical coupling member includes an optical fiber (13), a holder (11) that holds the optical fiber inserted from an insertion hole (11a) formed at one end, and a lens such as a collimator lens (12) accommodated in an accommodation section (11c) formed at the other end of the holder (11), the optical coupling member performing positioning by causing at least one of the lens and the end face of the optical fiber (13) to come into contact with an abutting surface ($11e_1$, $11e_2$) formed in the vicinity of the accommodation section (11c) by providing a recess (11e) on an outer circumference near the accommodation section (11c) of the holder (11), in which a plurality of the recesses (11e) are provided on an identical plane orthogonal to an insertion direction of the optical fiber (13).

15 Claims, 17 Drawing Sheets

(56) References Cited

U.S. PATENT DOCUMENTS

| | | | |
|---|---|---|---|
| 7,218,811 B2 | 5/2007 | Shigenaga et al. | |
| 7,474,822 B2 | 1/2009 | Kobayashi et al. | |
| 8,967,880 B2* | 3/2015 | Koike | G02B 6/4204 385/61 |
| 2003/0138204 A1* | 7/2003 | Zhou | G02B 6/2937 385/33 |
| 2004/0033033 A1* | 2/2004 | Hoshino et al. | 385/93 |
| 2006/0177182 A1* | 8/2006 | Mine et al. | 385/74 |
| 2008/0050073 A1* | 2/2008 | Kadar-Kallen et al. | 385/79 |
| 2009/0213894 A1* | 8/2009 | Grapov et al. | 372/107 |
| 2009/0269009 A1* | 10/2009 | Tanaka | 385/39 |
| 2010/0149650 A1* | 6/2010 | Tanaka et al. | 359/664 |
| 2013/0114926 A1* | 5/2013 | Moriya et al. | 385/33 |
| 2013/0156375 A1* | 6/2013 | Koike et al. | 385/33 |

FOREIGN PATENT DOCUMENTS

| | | |
|---|---|---|
| JP | 05-196840 A | 8/1993 |
| JP | 06-258556 A | 9/1994 |
| JP | 10-160992 A | 6/1998 |
| JP | 2004-004431 A | 1/2004 |
| JP | 2006-227132 A | 8/2006 |
| JP | 2007-241094 A | 9/2007 |
| JP | 2011-227201 A | 11/2011 |
| JP | 2011-242622 A | 12/2011 |
| JP | 2011-242623 A | 12/2011 |

OTHER PUBLICATIONS

International Search Report dated Jun. 26, 2012, issued in corresponding application No. PCT/JP2012/063214.

* cited by examiner

US 9,372,313 B2

OPTICAL COUPLING MEMBER AND OPTICAL CONNECTOR USING THE SAME, AND OPTICAL COUPLING MEMBER HOLDING MEMBER

TECHNICAL FIELD

The present invention relates to an optical coupling member used when light from a light-emitting device is condensed and inputted to an optical fiber or light emitted from an optical fiber is condensed on a light-receiving device, and an optical connector using the optical coupling member and an optical coupling member holding member.

BACKGROUND ART

Optical coupling members are used when light emitted from a light source is made to propagate through an optical fiber and emitted into the air as required or when light propagating through the air is inputted to an optical fiber. In such optical coupling members, it is necessary to appropriately position an end face of the optical fiber and a lens in order to reduce propagation losses. Conventionally, various methods for positioning the end face of such an optical fiber and the lens are known, such as a method that inserts a spacer as a separate member into a holding member (e.g., see Patent Literature 1) and a method that provides a spacer portion in a holding member itself (e.g., see Patent Literature 2).

CITATION LIST

Patent Literature

[Patent Literature 1] Japanese Patent Application Laid-Open No. 2007-241094
[Patent Literature 2] Japanese Utility Model Laid-Open No. 5-38606

SUMMARY OF THE INVENTION

Technical Problem

In recent years, studies are being carried out on the possibility of performing large-volume communication between apparatuses or in an apparatus using an optical fiber. Optical coupling members used for such applications are required to have a small size in the aspect of shape and maintain positional relationships between the optical fiber and lens even when they are inserted and removed repeatedly in the aspect of apparatus.

The methods according to Patent Literature 1 and Patent Literature 2 may be applied to positioning of the end face of the optical fiber and the lens in such an optical coupling member. However, the smaller the size of the optical coupling member, the more difficult it is to insert a spacer as a separate member into the holding member or provide a spacer portion in the holding member itself, resulting in a problem that the cost incurred in such an operation increases.

The present invention has been implemented in view of the above-described problems and it is an object of the present invention to provide an optical coupling member, an optical connector using this optical coupling member and an optical coupling member holding member capable of simply positioning a lens and an optical fiber while suppressing an increase in cost.

Solution to Problem

An optical coupling member according to the present invention is an optical coupling member including an optical fiber, a holding member that holds the optical fiber inserted from an insertion hole formed at one end, and a lens accommodated in an accommodation section formed at the other end of the holding member, the optical coupling member performing positioning by causing at least one of the lens and the end face of the optical fiber to come into contact with an abutting surface formed by providing a recess on an outer circumference near the accommodation section of the holding member, in which a plurality of the recesses are provided on an identical plane orthogonal to an insertion direction of the optical fiber.

According to the above-described optical coupling member, positioning is performed by causing at least one of the lens and the end face of the optical fiber to come into contact with an abutting surface formed by providing a recess in the holding member, and it is thereby possible to position the lens and/or the optical fiber using the recess as a reference. This improves operation efficiency compared to conventional cases where a spacer as a separate member is inserted into a holder holding member and where a spacer portion is provided in a holding member itself. As a result, it is possible to simply position the lens and the optical fiber while suppressing an increase in cost. Especially since a plurality of recesses are provided on an identical plane orthogonal to the insertion direction of the optical fiber, the lens and/or the optical fiber can be made to respectively come into contact with the abutting surface at a plurality of positions. As a result, it is possible to position the lens and/or the optical fiber with higher accuracy.

In the above-described optical coupling member, an angle of the abutting surface facing the optical fiber is preferably set to 20° or less with respect to the plane orthogonal to the insertion direction of the optical fiber and cause part of the end face of the optical fiber to come into contact with the abutting surface. By setting the angle of the abutting surface facing the optical fiber to 20° or less with respect to the plane orthogonal to the insertion direction of the optical fiber, when the optical fiber is an optical fiber (e.g., plastic optical fiber) configured of a core, a clad with which the core is coated and, if necessary, a reinforcing layer with which the clad is coated for reinforcement, with these end faces being arranged on an identical plane, it is possible to easily secure positional accuracy by causing the end face of the optical fiber to come into contact with the abutting surface. For this reason, the angle of the abutting surface is most preferably set to 0°, but desired positional accuracy can be secured if the angle is 20° or less.

In the above-described optical coupling member, it is preferable to set an angle of the abutting surface facing the optical fiber to 30° or more and 80° or less with respect to the plane orthogonal to the insertion direction of the optical fiber, cause part of a reinforcing layer making up the optical fiber to come into contact with the abutting surface and arrange a core and an end face of a clad making up the optical fiber closer to the lens side than the abutting portion. A glass optical fiber is normally provided with a reinforcing layer with which the clad is coated, and when the glass optical fiber is inserted into the holding member, the reinforcing layer at the end is peeled and the core and the end face of the clad remain protruding from the plane of the reinforcing layer. Even in the case where such a glass optical fiber is used, by setting the angle of the abutting surface facing the optical fiber to 30° or more and 80° or less with respect to the plane orthogonal to the insertion direction of the optical fiber as described above, it is possible to smoothly insert the optical fiber into a narrow gap surrounded by the abutting surface and make it easier to secure positional accuracy at the time of insertion.

In the above-described optical coupling member, it is further preferable to make the angle of the abutting surface facing the optical fiber different from the angle of the abutting surface facing the lens with respect to the plane orthogonal to the insertion direction of the optical fiber. By making the angle of the abutting surface facing the lens in the recess different from the angle of the abutting surface facing the optical fiber, it is possible to effectively position the lens and the optical fiber having different shapes.

In the above-described optical coupling member, it is further preferable to make the abutting surface facing the lens an inclined plane, set the angle of the inclined plane with respect to the plane orthogonal to the insertion direction of the optical fiber to 0° or more and 45° or less and cause part of the lens to come into contact with the inclined plane. In this case, since positioning can be performed with part of the optical fiber side being supported, positional accuracy of the lens can be increased.

In the above-described optical coupling member, it is preferable to apply removal processing to the abutting surface facing the lens. Applying removal processing to the abutting surface facing the lens in this way allows the abutting surface facing the lens in the recess to be smoothed, and can thereby prevent damage to the lens and also improve positional accuracy of the lens. There are various removal processing methods such as cutting, press (pressing) work, grinding, energy beam machining.

An optical connector of the present invention connects the optical coupling member according to any one of the aforementioned aspects. According to this optical connector, it is possible to obtain the operations and effects achieved by the aforementioned optical coupling member.

An optical coupling member holding member of the present invention is an optical coupling member holding member including a holding body that holds an optical fiber, an accommodation section provided at one end of the holding body for accommodating a lens and an insertion hole provided at the other end of the holding body for inserting the optical fiber, the optical coupling member holding member performing positioning by causing at least one of the lens and the end face of the optical fiber to come into contact with an abutting surface formed by providing a recess on a circumference near the accommodation section of the holding body, in which a plurality of the recesses are provided on an identical plane orthogonal to an insertion direction of the optical fiber.

According to the above-described optical coupling member holding member, since an abutting surface is formed for performing positioning by causing at least one of the lens and the optical fiber to come into contact by providing a recess near the accommodation section of the holding body, it is possible to position the lens and/or the optical fiber using the recess as a reference. This improves operation efficiency compared to conventional cases where a spacer as a separate member is inserted into a holder holding member and where a spacer portion is provided in a holding member itself. As a result, it is possible to simply position the lens and the optical fiber while suppressing an increase in cost. Especially since a plurality of recesses are provided on an identical plane orthogonal to the insertion direction of the optical fiber, the lens and/or the optical fiber can be respectively made to come into contact with the abutting surface at a plurality of positions, and it is thereby possible to position the lens and/or the optical fiber with higher accuracy.

In the above-described optical coupling member holding member, an angle of the abutting surface facing the optical fiber inserted via the insertion hole is preferably set to 20° or less with respect to the plane orthogonal to the insertion direction of the optical fiber. By setting the angle of the abutting surface facing the optical fiber to 20° or less with respect to the plane orthogonal to the insertion direction of the optical fiber, when the optical fiber is configured of a core, a clad with which the core is coated and, if necessary, a reinforcing layer with which the clad is coated for reinforcement and these end faces are configured of an optical fiber (e.g., plastic optical fiber) arranged on an identical plane, it is possible to easily secure positional accuracy by causing the end face of the optical fiber to come into contact with the abutting surface.

In the above-described optical coupling member holding member, an angle of the abutting surface facing the optical fiber inserted via the insertion hole is preferably set to 30° or more and 80° or less with respect to the plane orthogonal to the insertion direction of the optical fiber. The glass optical fiber is normally provided with a reinforcing layer with which the clad is coated, and when the glass optical fiber is inserted into the holding body, the reinforcing layer at the end is peeled and the core and the end face of the clad protrude from the plane of the reinforcing layer. Even in the case where such a glass optical fiber is used, by setting the angle of the abutting surface facing the optical fiber to 30° or more and 80° or less with respect to the plane orthogonal to the insertion direction of the optical fiber as described above, it is possible to smoothly insert the optical fiber into a narrow gap surrounded by the abutting surface and make it easier to secure positional accuracy at the time of insertion.

In the above-described optical coupling member holding member, it is further preferable to make the angle of the abutting surface facing the optical fiber inserted via the insertion hole different from the angle of the abutting surface facing the lens accommodated in the accommodation section with respect to the plane orthogonal to the insertion direction of the optical fiber. Making the angle of the abutting surface facing the lens in the recess different from the angle of the abutting surface facing the optical fiber, it is possible to effectively position the lens and the optical fiber having different shapes.

In the above-described optical coupling member holding member, it is further preferable to make the abutting surface facing the lens accommodated in the accommodation section an inclined plane, and set the angle of the inclined plane with respect to the plane orthogonal to the insertion direction of the optical fiber to 0° or more and 45° or less. In this case, since positioning can be performed with part of the optical fiber side being supported, positional accuracy of the lens can be increased.

In the above-described optical coupling member holding member, it is preferable to apply removal processing to the abutting surface facing the lens accommodated in the accommodation section. In this case, applying removal processing to the abutting surface facing the lens can smooth the abutting surface facing the lens in the recess, and can thereby prevent damage to the lens and also improve positional accuracy of the lens.

Technical Advantage of the Invention

According to the present invention, positioning is performed by causing at least one of the lens and the optical fiber to come into contact with an abutting surface formed by providing a recess in the holding member, and it is thereby possible to position the lens and/or the optical fiber using the recess as a reference. This improves operation efficiency compared to conventional cases where a spacer as a separate member is inserted into a holder holding member and where a spacer portion is provided in a holding member itself. As a result, it is possible to simply position the lens and the optical fiber while suppressing an increase in cost.

DESCRIPTION OF EMBODIMENTS

Figure 1:
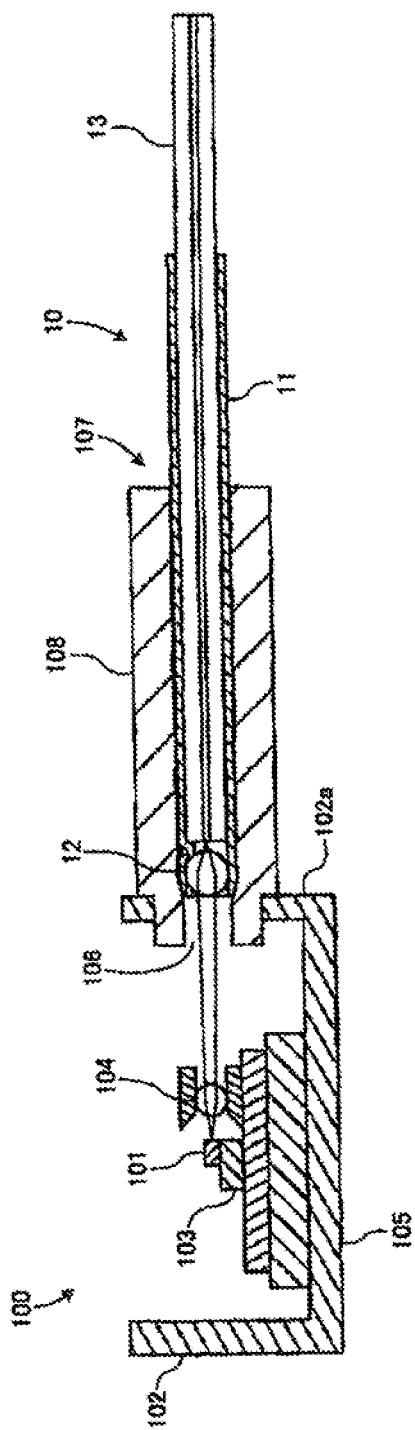
FIG. 1 is a cross-sectional side view schematically illustrating an optical connector to which an optical collimator as an optical coupling member according to the present invention is connected.

Hereinafter, embodiments of the present invention will be described in detail with reference to the accompanying drawings. First, an optical connector to which an optical collimator as an optical coupling member according to the present invention is connected will be described. FIG. 1 is a cross-sectional side view schematically illustrating an optical connector to which an optical collimator as an optical coupling member according to the present invention is connected. In FIG. 1, for convenience of description, an optical connector will be described which is provided with a semiconductor laser chip as a light source that emits light to the optical collimator and an optical lens on an optical axis of this semiconductor laser chip. However, the configuration of the optical connector is not limited to this, but various changes can be made as appropriate.

As shown in FIG. 1, an optical connector 100 to which the optical collimator according to the present invention is connected is provided with a semiconductor laser unit 105 configured such that a semiconductor laser chip 101 is placed on a mount base 103 of a case 102 and an optical lens 104 is placed on the optical axis of this semiconductor laser chip 101. The optical connector 100 is also provided with an adapter 108 configured such that an opening 106 is formed in a side face 102a of the case 102 for holding a holder 11 of the optical collimator 10 inserted from an insertion opening 107.

In the semiconductor laser unit 105, laser light emitted from the semiconductor laser chip 101 is transformed into parallel light by the optical lens 104 and guided to the opening 106. The parallel light from the optical lens 104 is condensed by a collimator lens 12 of the optical collimator 10 and inputted to an optical fiber 13. The incident light propagates through the optical fiber 13.

In the optical connector 100 according to the present embodiment, when the optical collimator 10 is inserted up to a predetermined position of the adapter 108, alignment between the optical lens 104 and the collimator lens 12 is performed. The system is designed so that the laser light from the semiconductor laser chip 101 may be appropriately inputted to the optical fiber 13. Hereinafter, the configuration of the optical collimator 10 according to the present embodiment connected to the optical connector 100 will be described.

First Embodiment

Figure 2:
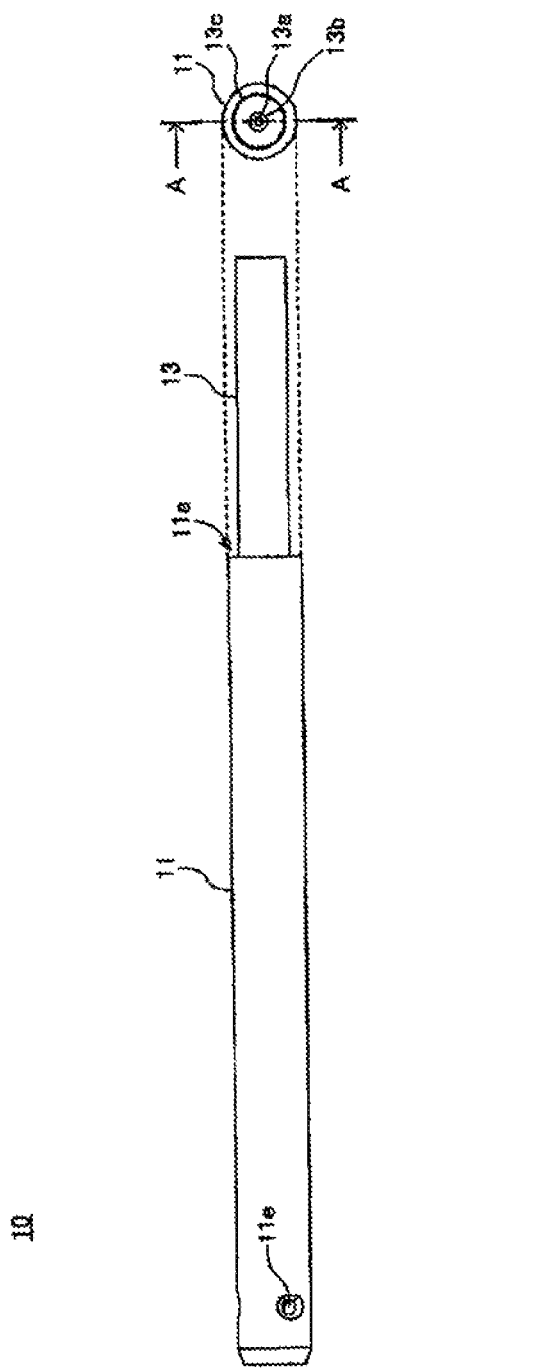
FIG. 2 is a side view of the optical collimator according to a first embodiment of the present invention.
Figure 3:
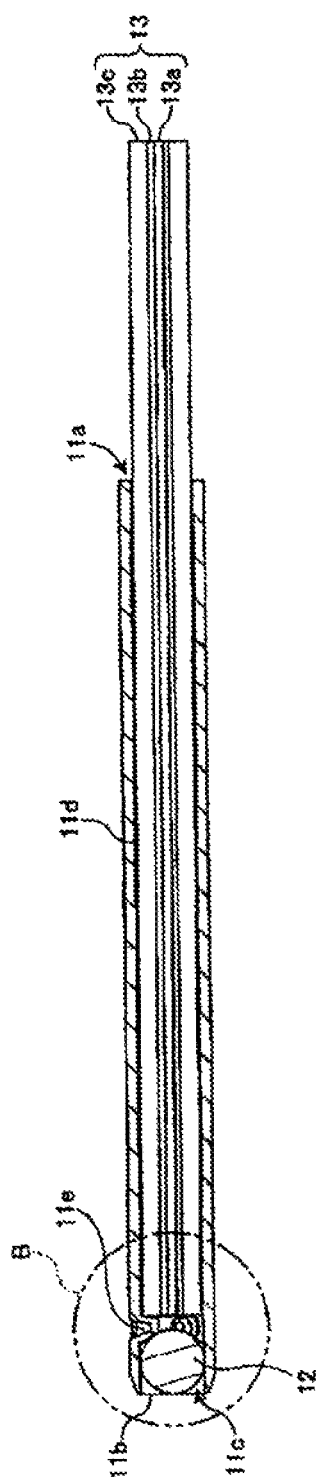
FIG. 3 is a cross-sectional view along A-A shown in FIG. 2.

FIG. 2 is a side view of the optical collimator 10 according to a first embodiment of the present invention. FIG. 3 is a cross-sectional view along A-A shown in FIG. 2. As shown in FIG. 2, the optical collimator 10 according to the first embodiment is configured by including a holder 11 as a holding member having a generally cylindrical shape, a collimator lens 12 held at one end of this holder 11, and an optical fiber 13 inserted from an insertion hole 11a provided at the other end of the holder 11. Note that in the optical collimator 10 according to the present embodiment, a plastic optical fiber is preferably inserted as the optical fiber 13.

The holder 11 is formed, for example, of a metal material. The metal material making up the holder 11 is preferably austenite-based stainless steel from the standpoint of workability in particular.

The holder 11 is formed by applying molding work to a resin material or ceramic material. As the resin material, for example, polypropylene (PP), acrylonitrile-butadiene-styrene copolymer (ABS), polyacetal (POM), polycarbonate (PC), polybutylene terephthalate (PBT), polyethylene terephthalate (PET), polyethylene naphthalate (PEN), polyethersulfone (PES), polyphenylene ether (PPE), polyamide imide (PAI), polyether imide (PEI) can be used. The holder 11 is formed by applying various types of molding such as injection molding, extrusion molding and press molding to these resin materials.

Furthermore, as the ceramic material, for example, zirconia, alumina, silicon nitride, silicon carbide can be used. The holder 11 is formed by applying various types of molding such as injection molding, extrusion molding and press molding to these ceramic materials. As the material making up the holder 11, glass and crystallized glass or the like can also be used.

As shown in FIG. 3, an opening 11b is provided at an end of the holder 11 on the collimator lens 12 side. An accommodation section 11c that accommodates the collimator lens 12 is provided inside this opening 11b. The accommodation section 11c is formed in a size slightly smaller than the diameter of the collimator lens 12 so that the collimator lens 12 can be pressed thereinto. The accommodation section 11c is provided in a size that allows the entire collimator lens 12 to be accommodated therein in order to prevent damage to the surface of the collimator lens 12.

Furthermore, a through hole 11d having a slightly larger diameter than the outer diameter of the optical fiber 13 is provided in the holder 11. This through hole 11d is provided so as to communicate with the insertion hole 11a and at the same time communicate with the accommodation section 11c. Moreover, a plurality of recesses 11e are provided on an outer circumferential surface of the holder 11. These recesses 11e are provided between the accommodation section 11c and the through hole 11d. As will be described in more detail later, these recesses 11e are used for positioning of the collimator lens 12 and the optical fiber 13. For example, when the holder 11 is formed of a metal material, these recesses 11e are formed from the outer circumferential part by applying pressing work using a tool or the like.

The collimator lens 12 is comprised of a spherical ball lens formed of, for example, a glass material. As shown in FIG. 3, the collimator lens 12, when accommodated in the accommodation section 11c of the holder 11, is disposed so as to face the opening 106 of the adapter 108 from the opening 11b and also face the distal end of the optical fiber 13 inserted in the through hole 11d.

The optical fiber 13 is formed of, for example, a plastic optical fiber and configured of a core 13a provided so as to penetrate the center of the optical fiber, a clad 13b with which the core 13a is coated and a reinforcing layer 13c with which the clad 13b is coated for reinforcement. On an end face of the optical fiber 13 opposed to the collimator lens 12, the core 13a, clad 13b and reinforcing layer 13c are arranged on an identical plane. That is, the core 13a, clad 13b and reinforcing layer 13c are arranged uniformly on the end face opposed to the collimator lens 12.

The optical fiber 13 is inserted into the through hole 11d via the insertion hole 11a. The optical fiber 13 is fixed with the distal end portion thereof placed in the vicinity of the collimator lens 12 so as to face the spherical surface thereof. In this case, the optical fiber 13 is fixed to the holder 11 using an adhesive applied between itself and the inner surface of the through hole 11d. The fixing of the optical fiber 13 to the holder 11 is not limited to this but any given fixing method is applicable.

In the optical collimator 10 according to the first embodiment, the optical fiber 13 is configured of, for example, a graded index (GI) type optical fiber. The optical fiber 13 is configured such that its refractive index continuously changes on a cross section perpendicular to the fiber axis. The core 13a and clad 13b are configured of fully fluorine-substituted optical resin in which H of a C—H bond is substituted by F. As such, the optical fiber 13 configured of fully fluorine-substituted optical resin and also configured of a GI type optical fiber is enabled to achieve high-speed and large-volume communication.

The optical collimator 10 according to the first embodiment configured as described above uses the recesses 11e provided in the holder 11 for simple positioning of the collimator lens 12 and the optical fiber 13 while suppressing an increase in cost. To be more specific, positioning is performed by causing parts of the collimator lens 12 and optical fiber 13 to come into contact with the abutting surface formed in the vicinity of the accommodation section 11c in the holder 11 by providing the recesses 11e in the holder 11. This eliminates the necessity for a configuration of a spacer for positioning with the collimator lens 12 and the optical fiber 13, and can thereby simply perform positioning with the collimator lens 12 and the optical fiber 13 while suppressing an increase in cost.

Figure 4:
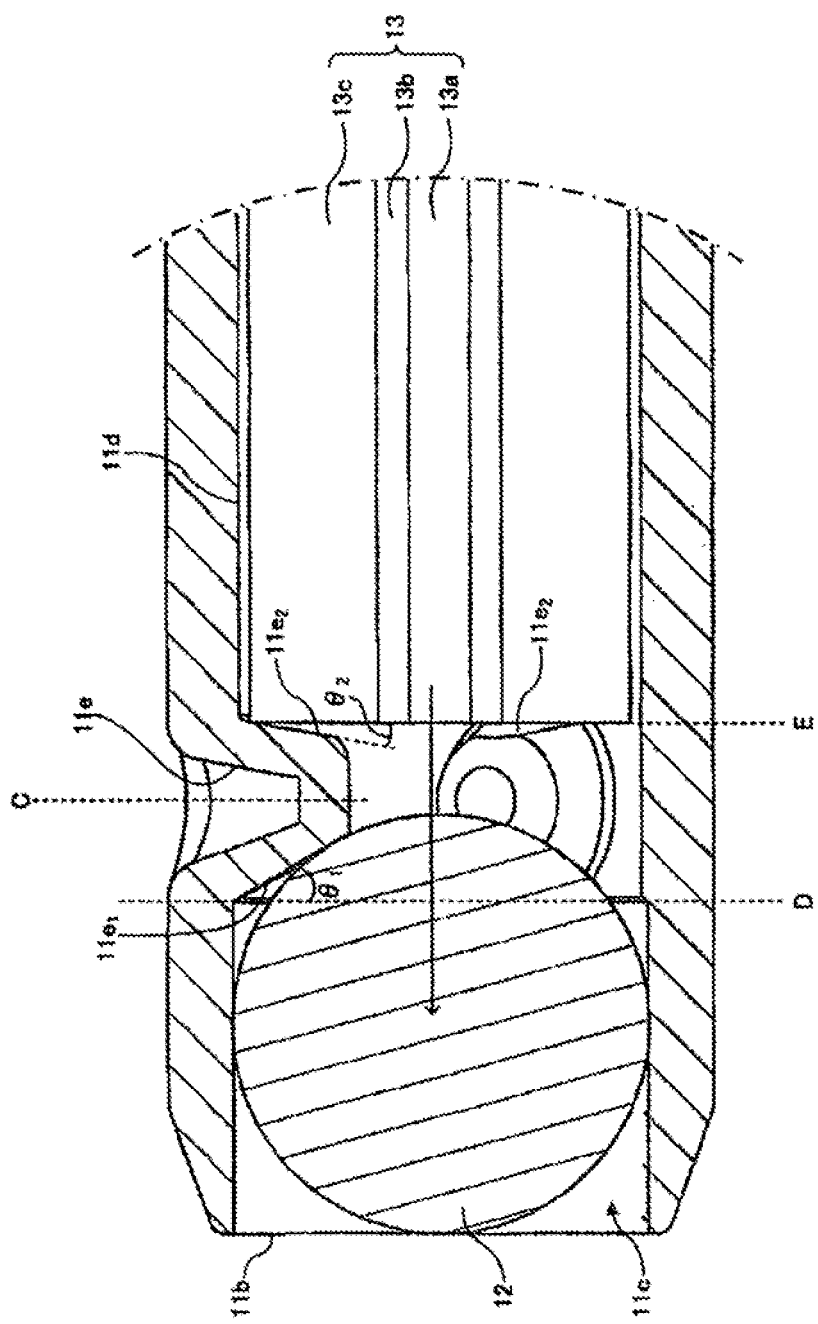
FIG. 4 is an enlarged view inside the two-dot dashed line B shown in FIG. 3.

Here, a method for positioning the collimator lens 12 and optical fiber 13 in the holder 11 of the optical collimator 10 according to the first embodiment will be described using FIG. 4. FIG. 4 is an enlarged view inside the two-dot dashed line B shown in FIG. 3. As shown in FIG. 4, an abutting surface $11e_1$ is formed in a portion of the recess 11e that faces the collimator lens 12, with which part of the collimator lens 12 comes into contact, and on the other hand, an abutting surface $11e_2$ is formed in a portion thereof that faces the optical fiber 13, with which part of the clad 13b and/or reinforcing layer 13c other than the core 13a making up the optical fiber 13 comes into contact. In such abutting positions, the collimator lens 12 and optical fiber 13 are positioned at their respective predetermined positions in the holder 11.

As shown in FIG. 4, the recess 11e is provided such that an angle of the abutting surface $11e_1$ facing the collimator lens 12 with respect to a plane orthogonal to the insertion direction of the optical fiber 13 (e.g., plane C which is disposed parallel to the end face of the optical fiber 13 shown in FIG. 4 and which passes through the center of the recess 11e) is set to be different from an angle of the abutting surface $11e_2$ facing the optical fiber 13. Thus, making the angle of the abutting surface $11e_1$ facing the collimator lens 12 different from the angle of the abutting surface $11e_2$ facing the optical fiber 13 makes it possible to effectively perform positioning of the collimator lens 12 and the optical fiber 13 which have different shapes.

When the holder 11 is formed of a metal material, such a recess 11e can be provided by applying pressing work using, for example, pointed tools having different distal end shapes. By applying pressing work using such tools, the recess 11e is provided such that the shape of the portion facing the collimator lens 12 (abutting surface $11e_1$) becomes asymmetric to the shape of the portion facing the optical fiber 13 (abutting surface $11e_2$) with reference to the central axis during the pressing work.

In the optical collimator 10 according to the first embodiment, a plurality of (three in the present embodiment) such recesses 11e are provided on the same circumference of the holder 11 (in other words, on the same plane orthogonal to the insertion direction of the optical fiber 13 on an inner face of the holder 11). Providing the plurality of recesses 11e on the same circumference allows the collimator lens 12 and the optical fiber 13 to come into contact with their respective abutting surfaces at a plurality of positions, making it possible to perform positioning of the collimator lens 12 and the optical fiber 13 with higher accuracy.

The abutting surface $11e_1$ of the recess 11e facing the collimator lens 12 forms an inclined plane. This inclined plane is provided so that an angle $\theta_1$ with respect to the plane orthogonal to the insertion direction of the optical fiber 13 indicated by an arrow in FIG. 4 (e.g., plane D which is disposed parallel to the end face of the optical fiber 13 shown in FIG. 4 and which passes through the proximal end of the recess 11e) becomes 0° or more and 45° or less. Setting the angle $\theta_1$ of the abutting surface $11e_1$ on the collimator lens 12 side with respect to the plane D orthogonal to the insertion direction of the optical fiber 13 to 0° or more and 45° or less in this way allows positioning with part of the collimator lens 12 on the optical fiber 13 side being supported, and it is thereby possible to increase positional accuracy of the collimator lens 12.

In the optical collimator 10 according to the first embodiment, removal processing through cutting, press work, grinding, or energy beam machining is applied to the surface of the abutting surface $11e_1$ of the recess 11e facing the collimator lens 12. Applying removal processing to the surface of the abutting surface $11e_1$ opposed to the collimator lens 12 in this way allows the abutting surface $11e_1$ of the recess 11e facing the collimator lens 12 to be smoothed. As a result, it is possible to prevent damage of this collimator lens 12 and also further increase positional accuracy of the collimator lens 12.

Such removal processing is likewise performed on optical collimators 20 and 30 according to second and third embodiments shown below.

On the other hand, the abutting surface $11e_2$ of the recess $11e$ facing the optical fiber 13 constitutes an inclined plane. The inclined plane is provided so that an angle $\theta_2$ with respect to the plane orthogonal to the insertion direction of the optical fiber 13 (e.g., plane E disposed parallel to the end face of the optical fiber 13 shown in FIG. 4) becomes 20° or less. Thus, the angle of the abutting surface $11e_2$ is provided to be 20° or less with respect to the plane E. Thus, when the optical fiber 13 is configured of an optical fiber (e.g., plastic optical fiber) in which the core $13a$, clad $13b$ and reinforcing layer $13c$ are arranged on the same plane as described above, by causing the end face of the optical fiber 13 to come into contact with the abutting surface $11e_2$, it is possible to more easily secure positional accuracy of these parts.

As described above, in the optical collimator 10 according to the first embodiment, positioning is performed by causing part of the collimator lens 12 and part of the optical fiber 13 to come into contact with the abutting surfaces $11e_1$ and $11e_2$ formed by providing the recess $11e$ in the holder 11. It is thereby possible to position the collimator lens 12 and the optical fiber 13 using the recess $11e$ as a reference, and improve operation efficiency compared to conventional cases where a spacer as a separate member is inserted in the holder 11, or a spacer portion is provided in the holder 11 itself. As a result, it is possible to simply position the collimator lens 12 and the optical fiber 13 while suppressing an increase in cost.

In the holder 11 of the optical collimator 10 according to the first embodiment, the collimator lens 12 and the optical fiber 13 are positioned using the recess $11e$ and the optical fiber 13 is fixed using an adhesive or the like applied between the optical fiber 13 and the inner surface of the through hole $11d$. In this case, since the through hole $11d$ is configured so as to be long enough to fix the optical fiber 13, the positioned optical fiber 13 can be firmly fixed. For this reason, in an application for carrying out large-volume communication between apparatuses or within an apparatus using the optical fiber 13, even when the optical fiber is repeatedly inserted and removed, it is possible to maintain the positional relationship with the optical fiber 13 and the collimator lens 12.

A case has been described above where the collimator lens 12 and the optical fiber 13 are positioned by causing part of the collimator lens 12 and part of the optical fiber 13 to come into contact with the abutting surfaces $11e_1$ and $11e_2$ formed by providing the recess $11e$ in the holder 11. However, the method of positioning the collimator lens 12 and the optical fiber 13 is not limited to this, but can be changed as appropriate. For example, instead of causing both the collimator lens 12 and the optical fiber 13 to come into contact with the abutting surfaces $11e_1$ and $11e_2$, one of the collimator lens 12 and the optical fiber 13 may be caused to come into contact with those abutting surfaces and the other may be positioned by part of the holder 11 other than the abutting surface $11e_1$ (abutting surface $11e_2$). In this case, however, the portion for positioning the other is presupposed to be designed to have a certain positional relationship with the abutting surface $11e_1$ (abutting surface $11e_2$). That is, the optical collimator 10 according to the present invention also includes an idea of causing one of the collimator lens 12 and the optical fiber 13 to come into contact with the abutting surfaces $11e_1$ and $11e_2$ formed by providing one of the collimator lens 12 and the optical fiber 13 in the recess $11e$.

Second Embodiment

An optical collimator according to a second embodiment is different from the optical collimator 10 according to the first embodiment in that the configuration of an optical fiber to be inserted is different and the shape of a recess for positioning this differs in accordance with the configuration of this optical fiber. Hereinafter, the configuration of the optical collimator according to the second embodiment will be described focusing on differences from the optical collimator 10 according to the first embodiment.

Figure 5:
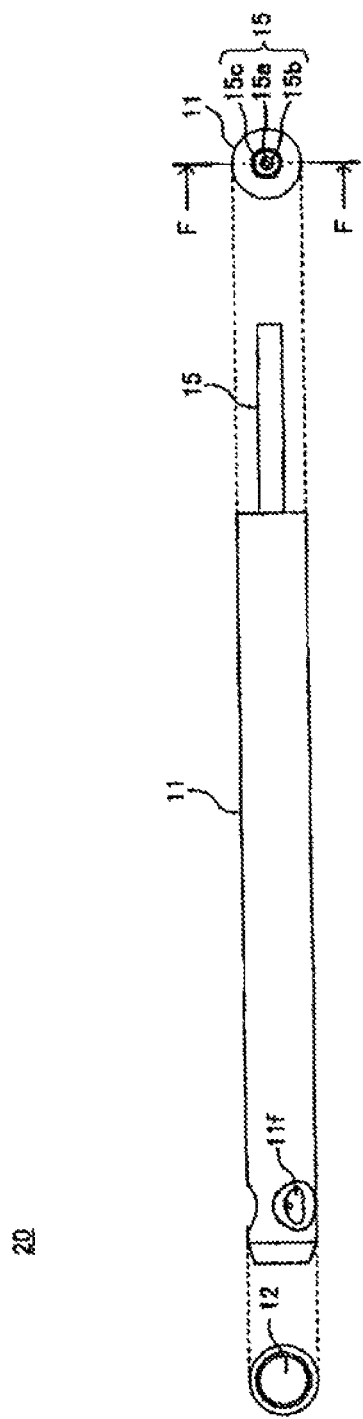
FIG. 5 is a side view of an optical collimator according to a second embodiment of the present invention.
Figure 6:
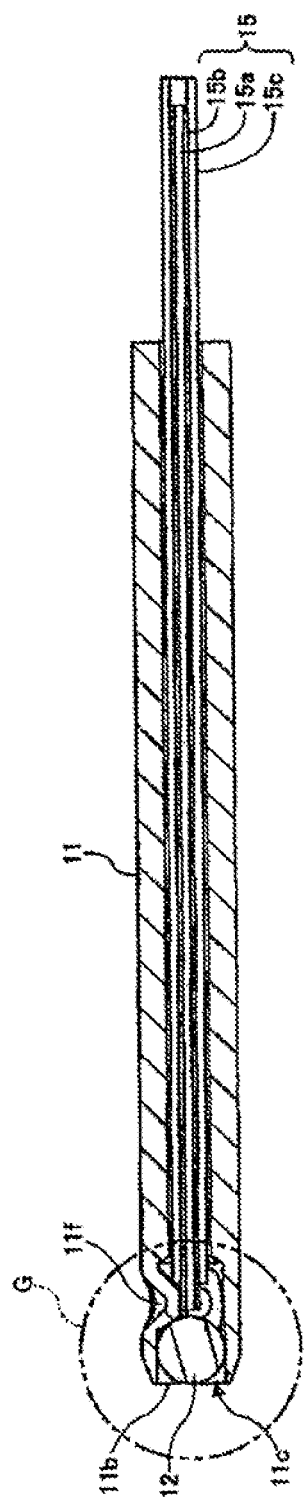
FIG. 6 is a cross-sectional view along F-F shown in FIG. 5.
Figure 7:
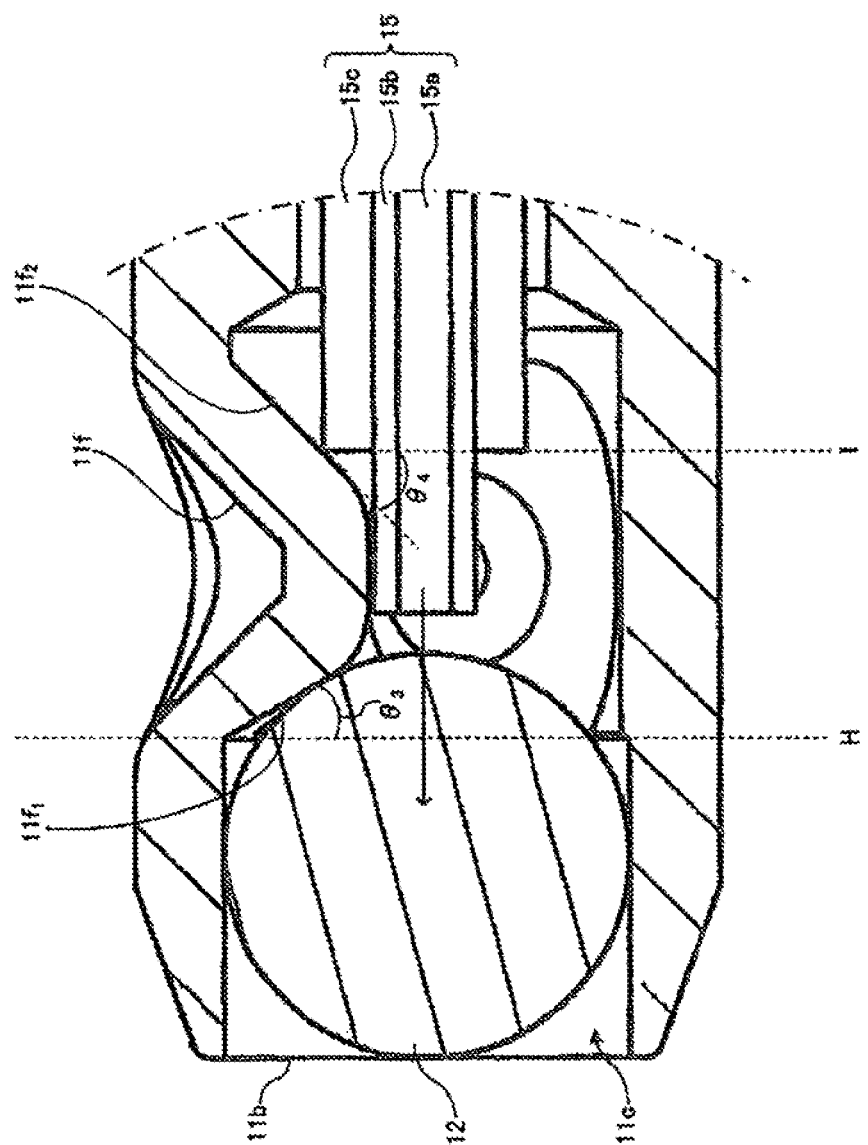
FIG. 7 is an enlarged view inside the two-dot dashed line G shown in FIG. 6.

FIG. 5 is a side view of an optical collimator 20 according to the second embodiment of the present invention. FIG. 6 is a cross-sectional view along F-F shown in FIG. 5. FIG. 7 is an enlarged view inside the two-dot dashed line G shown in FIG. 6. Note that in FIG. 5 to FIG. 7, components common to those of the optical collimator 10 according to the first embodiment shown in FIG. 2 to FIG. 4 will be assigned the same reference numerals and description thereof will be omitted.

An optical fiber 15 inserted into the optical collimator 20 according to the second embodiment is made up of, for example, a glass optical fiber. The optical fiber 15 is configured of a core $15a$ provided so as to penetrate a center thereof, a clad $15b$ with which the core $15a$ is coated and a reinforcing layer $15c$ with which the clad $15b$ is further coated. The optical fiber 15 is made of, for example, a glass material.

As shown in FIG. 6, the coating of the reinforcing layer $15c$ is removed from the optical fiber 15 on an end face facing the collimator lens 12, and the clad $15b$ and the core $15a$ protrude on the collimator lens 12 side. That is, on the end face facing the collimator lens 12, the core $15a$ and the clad $15b$ protrude on the collimator lens 12 side more than the end face configured of the reinforcing layer $15c$.

A recess $11f$ is provided between the accommodation section $11c$ and the through hole $11d$ of the holder 11 for positioning the collimator lens 12 and the optical fiber 15. The recess $11f$ has a shape different from that of the recess $11e$ according to the first embodiment in accordance with the aforementioned configuration of the optical fiber 15. To be more specific, the recess $11f$ is different from the recess $11e$ according to the first embodiment in the shape of the portion facing the optical fiber 15. The shape of the recess $11f$ will be described later.

Here, a method of positioning the collimator lens 12 and the optical fiber 15 in the holder 11 of the optical collimator 20 having such a recess $11f$ will be described. As shown in FIG. 7, an abutting surface $11f_1$ is formed in a portion of the recess $11f$ facing the collimator lens 12 and part of the collimator lens 12 comes into contact therewith. On the other hand, an abutting surface $11f_2$ is formed in a portion of the recess $11f$ facing the optical fiber 15 and part of the reinforcing layer $15c$ making up the optical fiber 15 comes into contact therewith. In this case, the core $15a$ and the clad $15b$ are arranged so as to protrude on the collimator lens 12 side more than the above-described abutting position at which the part of the reinforcing layer $15c$ comes into contact with the abutting surface $11f_2$. The collimator lens 12 and the optical fiber 15 are positioned in their respective predetermined positions in the holder 11 in such an abutting condition.

As shown in FIG. 7, the abutting surface $11f_1$ of the recess $11f$ facing the collimator lens 12 constitutes an inclined plane. This inclined plane has a configuration similar to that of the inclined plane making up the abutting surface $11e_1$ of the recess $11e$ according to the first embodiment. The inclined plane is provided so that an angle $\theta_3$ with respect to a plane orthogonal to an insertion direction of the optical fiber 15 indicated by an arrow in FIG. 7 (e.g., plane H disposed parallel to the end face of the optical fiber 15 shown in FIG. 7 and passing through the proximal end portion of the recess $11f$) becomes 0° or more and 45° or less. Thus, by setting the angle $\theta_3$ of the abutting surface $11f_1$ on the collimator lens 12 side to 0° or more and 45° or less with respect to the plane H orthogonal to the insertion direction of the optical fiber 15, it is possible to perform positioning while supporting part of the spherical collimator lens 12 on the optical fiber 15 side and thereby increase positional accuracy of the collimator lens 12.

On the other hand, the abutting surface $11f_2$ of the recess $11f$ facing the optical fiber 15 constitutes an inclined plane. This inclined plane $11f_2$ is provided so that an angle $\theta_4$ with respect to a plane orthogonal to the insertion direction of the optical fiber 13 (e.g., plane I disposed parallel to the end face of the reinforcing layer 15c of the optical fiber 13 shown in FIG. 7) becomes 30° or more and 80° or less. As described above, in the case where by setting the angle of the abutting surface $11f_2$ facing the optical fiber 15 to 30° or more and 80° or less with respect to the plane I orthogonal to the insertion direction of the optical fiber 15, the optical fiber 15 is configured of an optical fiber (e.g., glass optical fiber) made up of the core 15a, clad 15b and reinforcing layer 15c as described above, with the core 15a and the clad arranged so as to protrude from the plane of the reinforcing layer 15c, it is possible to smoothly insert the optical fiber 15 and easily secure positional accuracy of the collimator lens 12 and the optical fiber 15.

As described above, the optical collimator 20 according to the first embodiment performs positioning by causing part of the collimator lens 12 and part of the optical fiber 15 to come into contact with the abutting surfaces $11f_1$ and $11f_2$ formed by providing the recess $11f$ in the holder 11. Thus, it is possible to position the collimator lens 12 and the optical fiber 15 using the recess $11f$ as a reference, and thereby improve operation efficiency compared to conventional cases where a spacer as a separate member is inserted in the holder 11, or a spacer portion is provided in the holder 11 itself, and simply position the collimator lens 12 and the optical fiber 15 while suppressing an increase in cost.

The optical collimator 20 according to the second embodiment is similar to the optical collimator 10 according to the first embodiment in that the recess $11f$ is provided so that the angle of the abutting surface $11f_1$ facing the collimator lens 12 is different from the angle of the abutting surface $11f_2$ facing the optical fiber 15, and that a plurality of recesses $11f$ are provided on the same circumference of the holder 11. For this reason, the optical collimator 20 according to the second embodiment can also obtain effects associated with the configuration of these recesses $11f$.

Third Embodiment

An optical collimator according to a third embodiment is different from the optical collimator 10 according to the first embodiment in the configuration of the recess. Hereinafter, the configuration of the optical collimator according to the third embodiment will be described focusing on differences from the optical collimator 10 according to the first embodiment.

Figure 8:
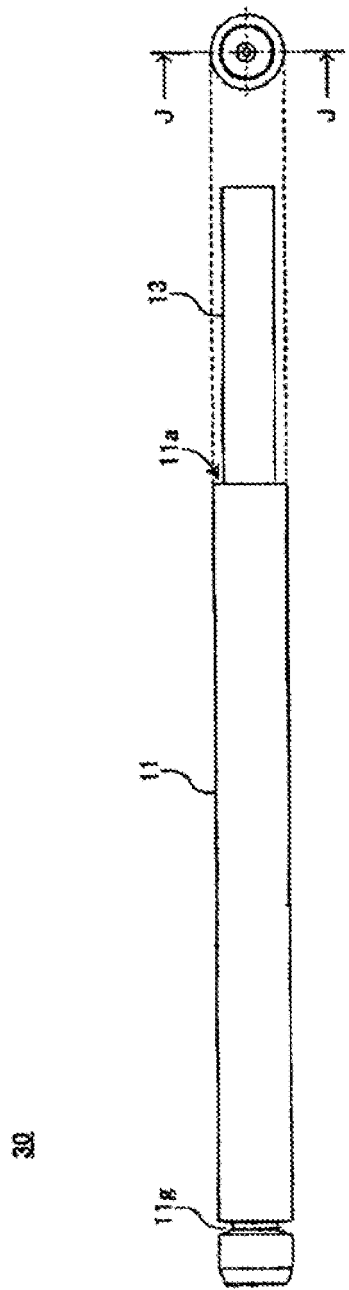
FIG. 8 is a side view of an optical collimator according to a third embodiment of the present invention.
Figure 9:
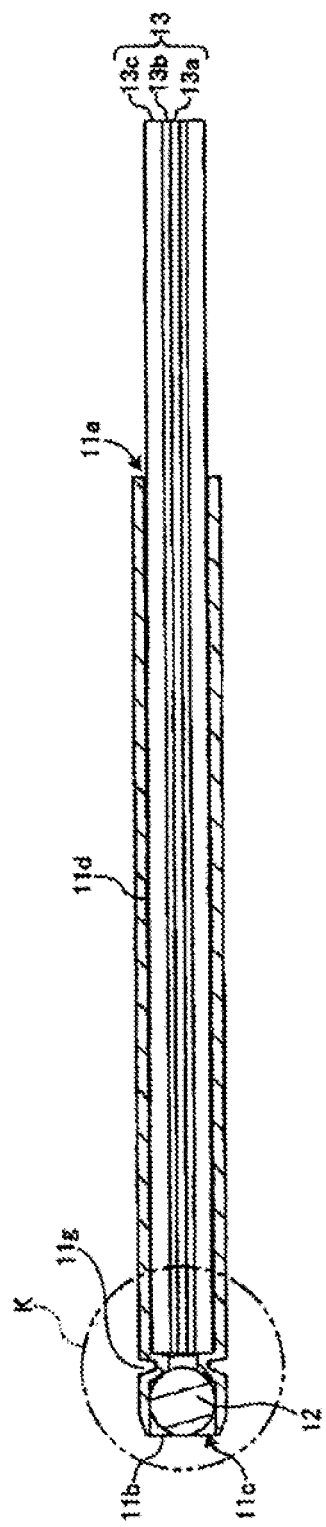
FIG. 9 is a cross-sectional view along J-J shown in FIG. 8.
Figure 10:
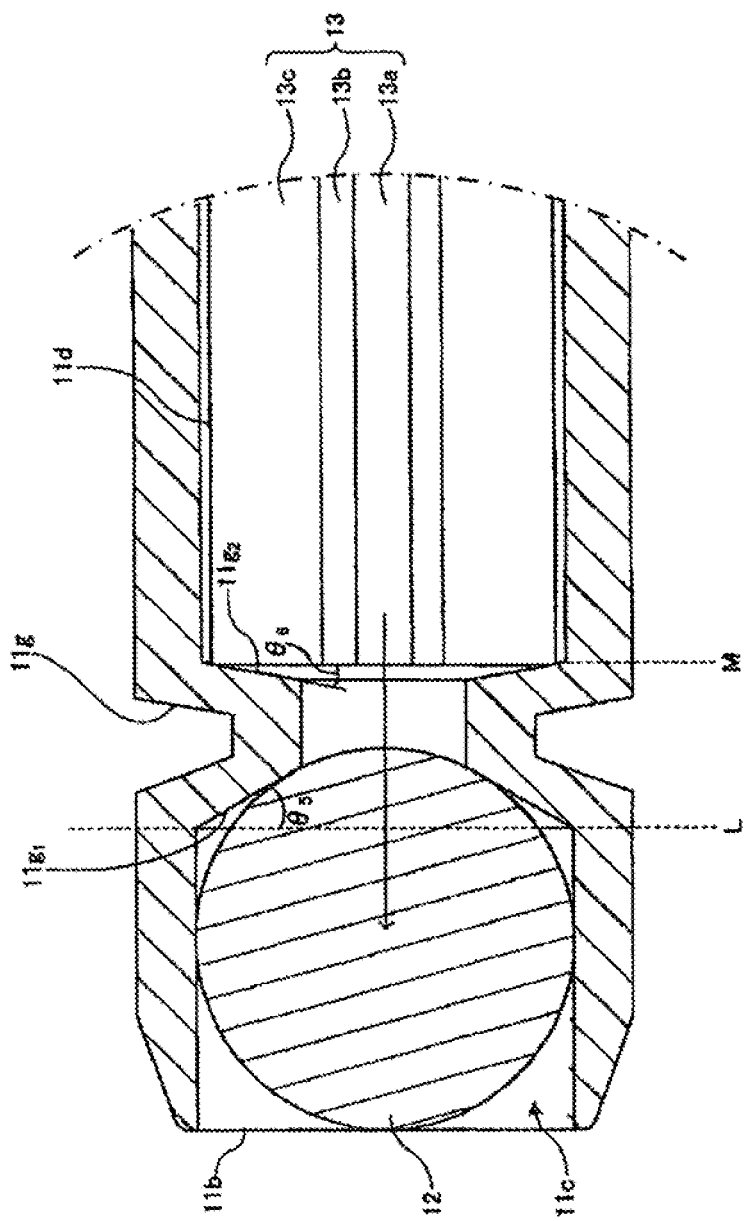
FIG. 10 is an enlarged view inside the two-dot dashed line K shown in FIG. 9.

FIG. 8 is a side view of an optical collimator 30 according to the third embodiment of the present invention. FIG. 9 is a cross-sectional view along J-J shown in FIG. 8. FIG. 10 is an enlarged view inside the two-dot dashed line K shown in FIG. 9. In FIG. 8 to FIG. 10, components common to those of the optical collimator 10 according to the first embodiment shown in FIG. 2 to FIG. 4 will be assigned the same reference numerals and description thereof will be omitted.

In the optical collimator 30 according to the third embodiment, a recess 11g is provided on an entire circumferential surface of the holder 11 between the accommodation section 11c and the through hole 11d as shown in FIG. 8 and FIG. 9.

That is, the recess 11g is provided so as to configure a ring-shaped concave portion in the holder 11 between the accommodation section 11c and the through hole 11d.

Here, a method of positioning the collimator lens 12 and the optical fiber 13 in the holder 11 of the optical collimator 30 having such a recess 11g will be described. As shown in FIG. 10, an abutting surface $11g_1$ is formed in a portion of the recess 11g facing the collimator lens 12 and part of the collimator lens 12 is in contact therewith. On the other hand, an abutting surface $11g_2$ is formed in a portion of the recess 11g facing the optical fiber 13 and part of the clad 13b and/or reinforcing layer 13c making up the optical fiber 13 is in contact therewith. In such a contacting state, the collimator lens 12 and the optical fiber 13 are positioned at their respective predetermined positions of the holder 11.

The abutting surface $11g_1$ of the recess 11g facing the collimator lens 12 constitutes an inclined plane. As in the case of the inclined plane making up the abutting surface $11e_1$ of the recess 11e according to the first embodiment, this inclined plane is provided so that an angle $\theta_5$ with respect to a plane orthogonal to the insertion direction of the optical fiber 13 indicated by an arrow in FIG. 10 (e.g., plane L disposed parallel to the end face of the optical fiber 13 shown in FIG. 10 and passing through the proximal end portion of the recess 11g) becomes 0° or more and 45° or less. By setting the angle $\theta_5$ of the abutting surface $11g_1$ on the collimator lens 12 side to 0° or more and 45° or less with respect to the plane orthogonal to the central axis L in the insertion direction of the optical fiber 13, it is possible to perform positioning while supporting part of the spherical collimator lens 12 on the optical fiber 13 side, and thereby increase positional accuracy of the collimator lens 12.

On the other hand, the abutting surface $11g_2$ of the recess 11g facing the optical fiber 13 constitutes an inclined plane. As in the case of the inclined plane making up the abutting surface $11e_2$ of the recess 11e according to the first embodiment, this inclined plane is provided so that an angle $\theta_6$ with respect to a plane orthogonal to the insertion direction of the optical fiber 13 (e.g., plane M disposed parallel to the end face of the optical fiber 13 shown in FIG. 10) becomes 20° or less. In this way, by setting the angle of the abutting surface $11g_2$ to 20° or less with respect to the plane M, when the optical fiber 13 is configured of an optical fiber (e.g., plastic optical fiber) on which the core 13a and the clad 13b are disposed on the same plane as described above, it is possible to easily secure the positional accuracy of these parts by causing the end face of the optical fiber 13 to come into contact with the abutting surface $11g_2$. For this reason, the angle of the abutting surface $11g_2$ is most preferably 0°, but the desired positional accuracy can be secured if it is at least 20° or less.

As described above, in the optical collimator 30 according to the third embodiment, positioning is performed by causing part of the collimator lens 12 and part of the optical fiber 13 to come into contact with the abutting surfaces $11g_1$ and $11g_2$ formed by providing the recess 11g in the holder 11. This allows the collimator lens 12 and the optical fiber 13 to be positioned using the recess 11g as a reference, making it possible to improve operation efficiency compared to conventional cases where a spacer as a separate member is inserted in the holder 11 or where a spacer portion is provided in the holder 11 itself, and simply position the collimator lens 12 and the optical fiber 13 while suppressing an increase in cost.

Note that the optical collimator 30 according to the third embodiment is similar to the optical collimator 10 according to the first embodiment in that the recess 11g is provided such that the angle of the abutting surface $11g_1$ facing the collimator lens 12 is different from the angle of the abutting surface $11g_2$ facing the optical fiber 13. For this reason, the optical collimator 30 according to the third embodiment can also obtain effects associated with the configuration of the recess $11g$.

Note that the present invention is not limited to the above-described embodiments but can be implemented modified in various ways. In the above-described embodiments, sizes and shapes or the like are not limited to those shown in the accompanying drawings, but can be changed as appropriate within a range in which the effects of the present invention can be exerted. The present invention can be implemented modified in other aspects as appropriate without departing from the scope of the object of the present invention.

As an example of the optical coupling member, the above-described embodiments have described the optical collimator 10 (20, 30) that condenses parallel light, inputs the condensed light to the optical fiber or transforms light emitted from the optical fiber into parallel light. However, the optical coupling member according to the present invention is not limited to the optical collimator. The optical coupling member according to the present invention is applicable to an optical coupling member in any given configuration on condition that light from a light-emitting device is condensed and impinged on an optical fiber or light emitted from an optical fiber is condensed to a light-receiving device.

Figure 11A:
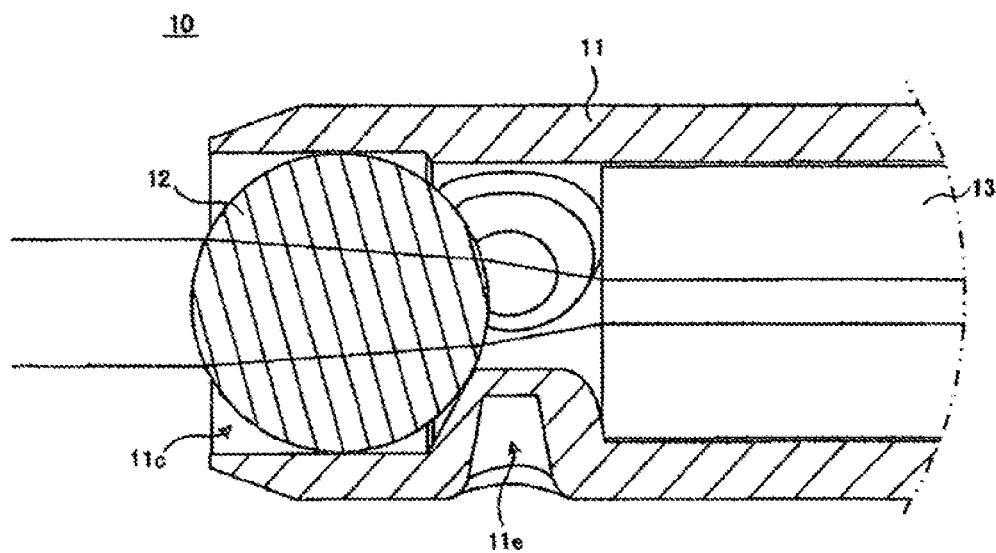
FIG. 11 is an enlarged view in the periphery of main parts of the optical coupling member.
Figure 11B:
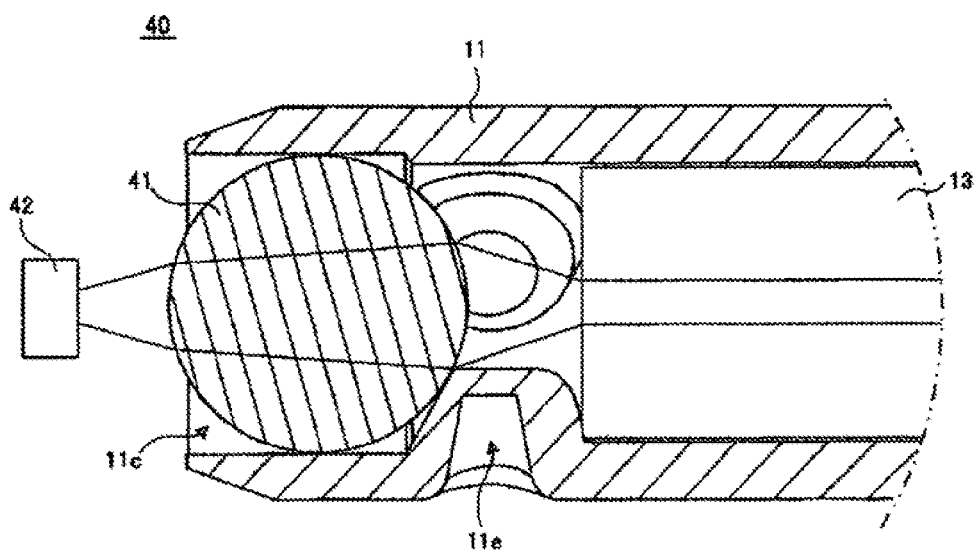

FIG. 11 is an enlarged view in the periphery of main parts of the optical coupling member according to the present invention. Note that in FIG. 11, components identical to those in FIG. 3 will be assigned the same reference numerals and detailed description thereof will be omitted. FIG. 11A shows an enlarged view in the periphery of the collimator lens 12 of the optical collimator 10 according to the above-described first embodiment. FIG. 11B shows an enlarged view in the periphery of a lens 41 of an optical coupling member 40 in a configuration different from those of the optical collimators 10, 20 and 30 according to the above-described first to third embodiments.

In the optical coupling member 40 shown in FIG. 11B, the configuration of the lens 41 accommodated in the accommodation section $11c$ of the holder 11 is different from that of the collimator lens 12 of the optical collimator 10 according to the above-described first embodiment. The lens condenses light emitted from a light-receiving/emitting device 42 (non-parallel emitted light), inputs the condensed light to the optical fiber 13 or condenses the light emitted from the optical fiber 13 to the light-receiving/emitting device 42 without transforming it to parallel light. The configuration of the recess $11e$ or the like provided in the holder 11 is common to the recess $11e$ of the optical collimator 10 according to the above-described first embodiment.

In the optical coupling member 40 including such a lens 41, it is also possible to perform positioning by causing part of the lens 41 and part of the optical fiber 13 to come into contact with the abutting surfaces $11e_1$ and $11e_2$ formed by providing the recess $11e$ in the holder 11. This makes it possible to position the lens 41 and the optical fiber 13 using the recess $11e$ as a reference, and thereby improve operation efficiency compared to conventional cases where a spacer as a separate member is inserted in the holder 11 or where a spacer portion is provided in the holder 11 itself. As a result, it is possible to simply position the lens 41 and the optical fiber 13 while suppressing an increase in cost.

Each of the above-described embodiments has described the optical collimator 10 (20, 30) in which the distance between the collimator lens 12 and the optical fiber 13 (15) in the holder 11 is configured to be relatively short. However, the distance between the collimator lens 12 and the optical fiber 13 (15) can be changed as appropriate according to factors such as condensing characteristics of the collimator lens 12 and positional relationship with the light-receiving/emitting device.

Hereinafter, an optical collimator (optical coupling member) 50, 60 when the distance between the collimator lens 12 and the optical fiber 13 in the holder 11 is configured to be relatively long will be described. The following description will be given with reference to the optical collimator for convenience of description, but the present invention is also applicable to the optical coupling member as shown in FIG. 11B.

Figure 12:
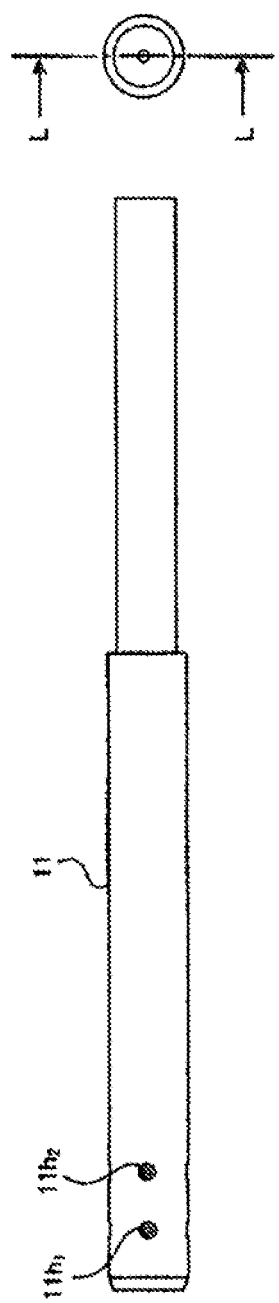
FIG. 12 is a side view of an optical collimator according to a first modification.
Figure 13:
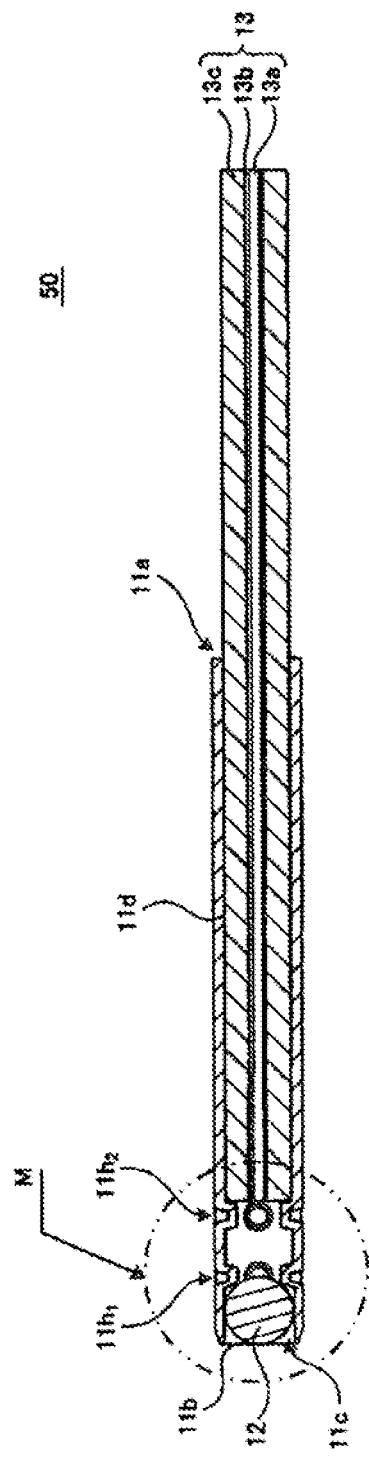
FIG. 13 is a cross-sectional view along L-L shown in FIG. 12.
Figure 14:
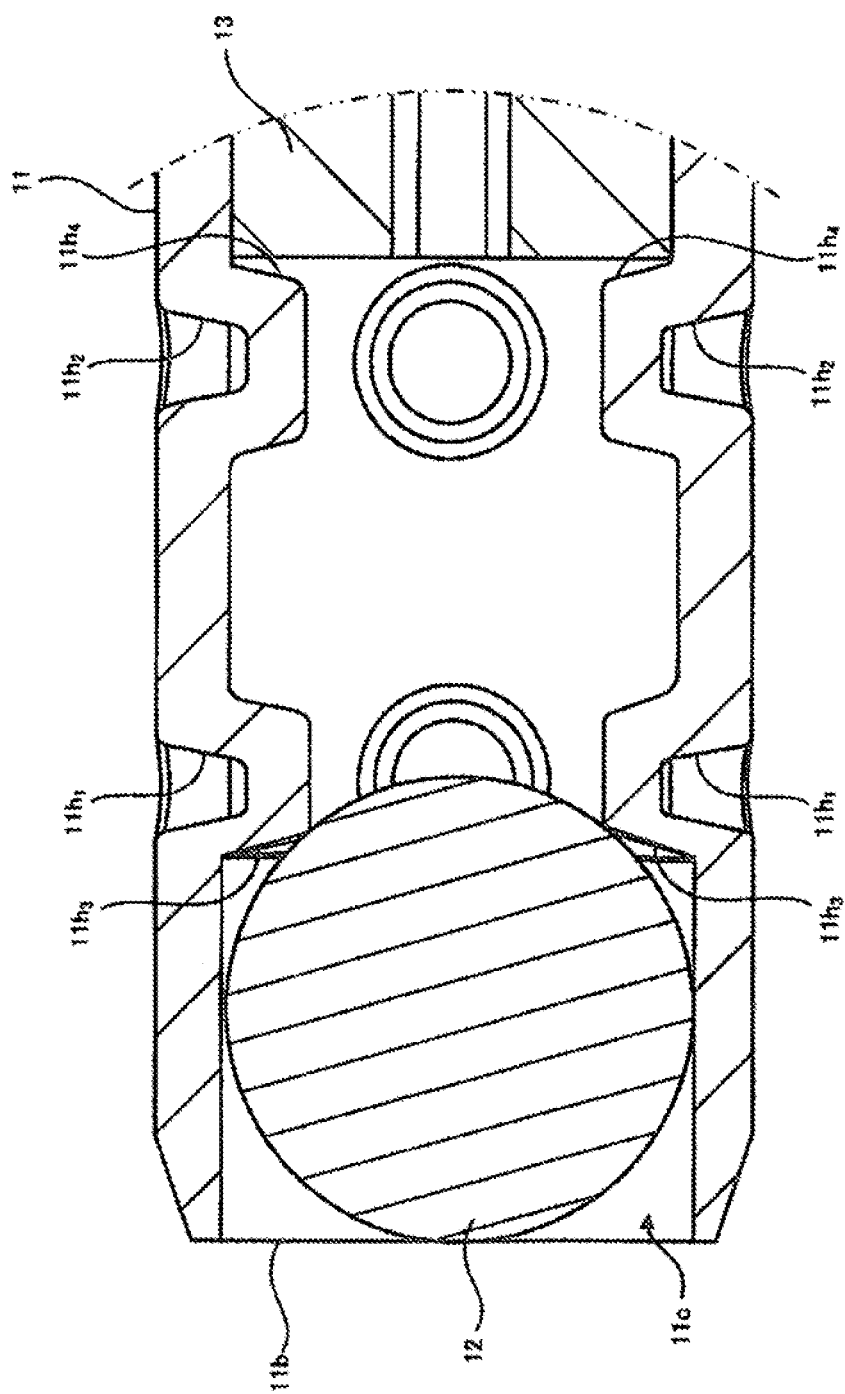
FIG. 14 is an enlarged view inside the two-dot dashed line M shown in FIG. 13.
Figure 15:
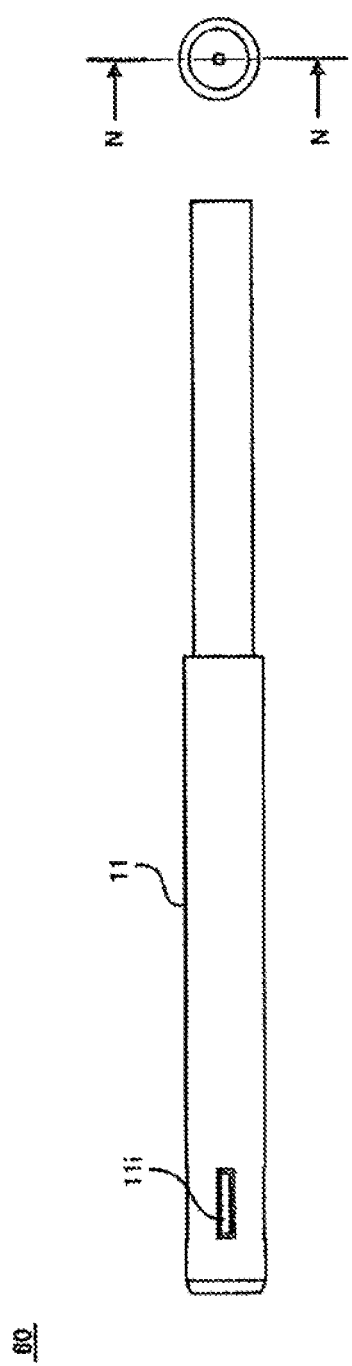
FIG. 15 is a side view of an optical collimator according to a second modification.
Figure 16:
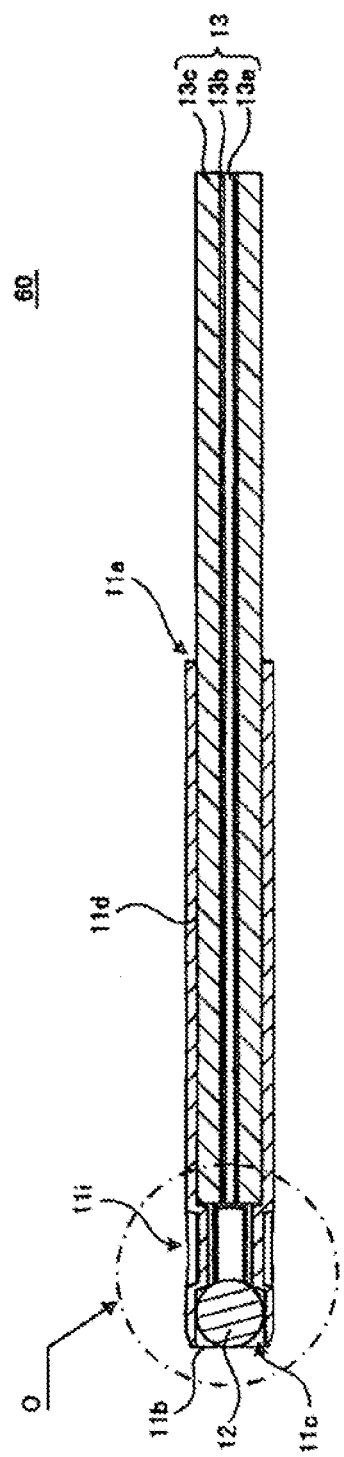
FIG. 16 is a cross-sectional view along N-N shown in FIG. 15.
Figure 17:
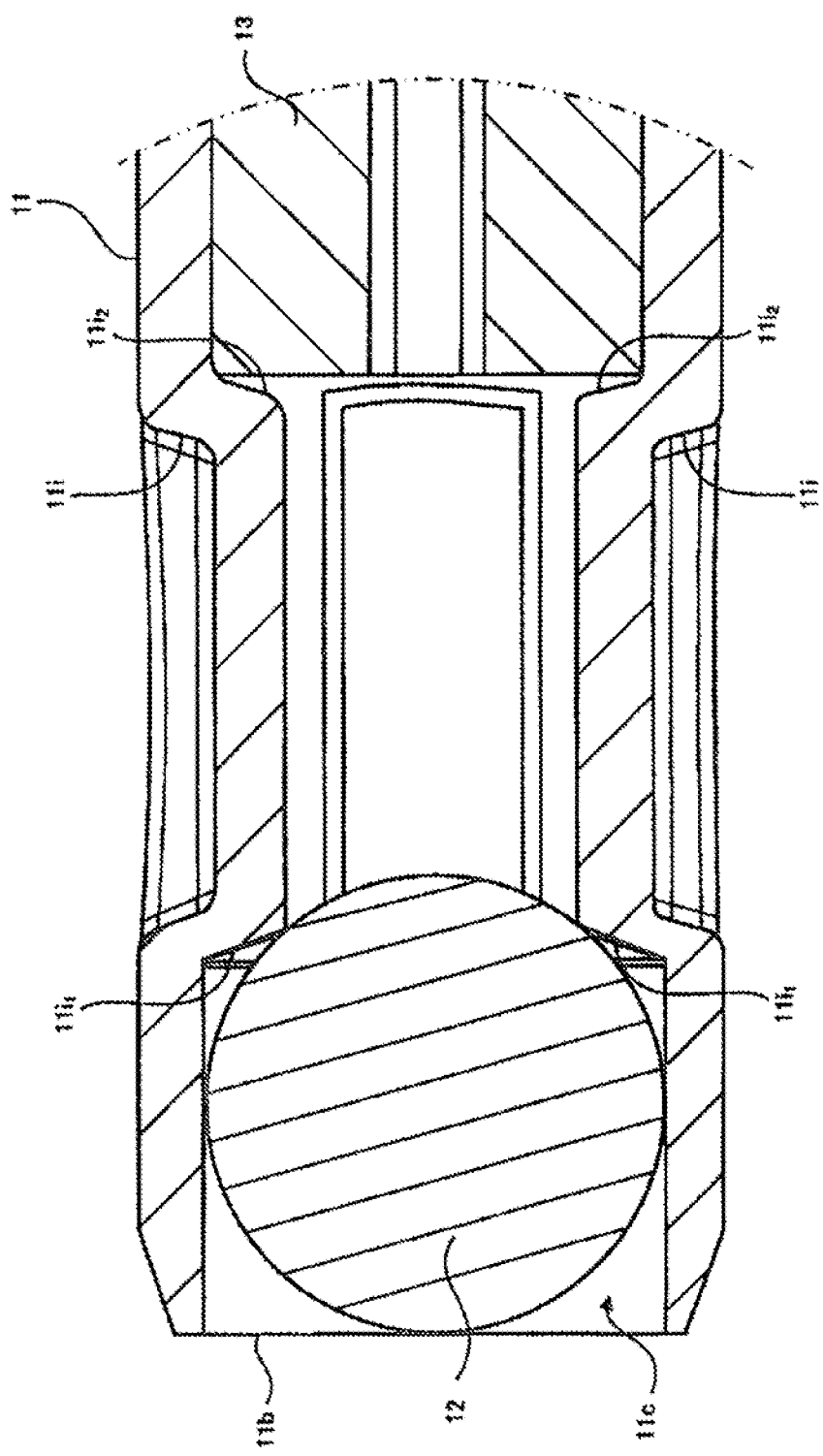
FIG. 17 is an enlarged view inside the two-dot dashed line O shown in FIG. 16.

FIG. 12 is a side view of an optical collimator 50 according to a first modification of the present invention. FIG. 13 is a cross-sectional view along L-L shown in FIG. 12. FIG. 14 is an enlarged view inside the two-dot dashed line M shown in FIG. 13. FIG. 15 is a side view of an optical collimator 60 according to a second modification of the present invention. FIG. 16 is a cross-sectional view along N-N shown in FIG. 15. FIG. 17 is an enlarged view inside the two-dot dashed line O shown in FIG. 16. Note that in FIG. 12 to FIG. 17, components identical to those in FIG. 3 will be assigned the same reference numerals and detailed description thereof will be omitted.

In the optical collimator 50 shown in FIG. 12 to FIG. 14, recesses $11h$ ($11h_1$, $11h_2$) are provided spaced from each other by a certain distance in the insertion direction of the optical fiber 13. A recess $11h_1$ is provided at a position on the opening $11b$ side and a recess $11h_2$ is provided at a position on the insertion hole $11a$ side. A plurality of recesses $11h$ ($11h_1$, $11h_2$) (four in examples shown in FIG. 12 to FIG. 14) are provided on the same circumference (in other words, on the same plane orthogonal to the insertion direction of the optical fiber 13 on an inner surface of the holder 11). The recess $11h_1$ is used for positioning of the collimator lens 12. On the other hand, the recess $11h_2$ is used for positioning of the optical fiber 13. To be more specific, an abutting surface $11h_3$ on the opening $11b$ side formed in the holder 11 by providing the recess $11h_1$ is used for positioning of the collimator lens 12. On the other hand, an abutting surface $11h_4$ on the insertion hole $11a$ side is used for positioning of the optical fiber 13.

On the other hand, in an optical collimator 60 shown in FIG. 15 to FIG. 17, a recess $11i$ is provided which extends by a certain length in the insertion direction of the optical fiber 13. A plurality of recesses $11i$ (two in examples shown in FIG. 15 to FIG. 17) are provided on the same circumference (in other words, on the same plane orthogonal to the insertion direction of the optical fiber 13 on an inner surface of the holder 11). The recess $11i$ is used for positioning of the collimator lens 12 and the optical fiber 13. To be more specific, when the recess $11i$ is provided, an abutting surface $11i_1$ on the opening $11b$ side formed in the holder 11 is used for positioning of the collimator lens 12 and an abutting surface $11i_2$ on the insertion hole $11a$ side is used for positioning of the optical fiber 13.

By providing the recesses $11h$ and $11i$ on the circumference of the holder 11 as shown in FIG. 12 to FIG. 17, it is possible to configure a relatively long distance between the collimator lens 12 and the optical fiber 13. Note that the number of recesses $11h$ provided in the holder 11 (the number of recesses $11h$ provided in the insertion direction of the optical fiber 13) and the length of the recess $11i$ can be changed as appropriate. Providing such recesses $11h$ and $11i$ in the holder 11 makes it possible to appropriately condense light emitted from the light-emitting device and the optical fiber 13 in various environments differing in condensing characteristics of the collimator lens 12 and positional relationship with the light-receiving/emitting device or the like.

Furthermore, although a case has been described in the above-described embodiments where the collimator lens 12 provided for the optical collimator 10 (20, 30) is configured of a glass material, the configuration of the collimator lens 12 is not limited to this, but can be changed as appropriate. For example, the collimator lens 12 may be configured of a plastic material and the shape thereof is not limited to a spherical lens either.

Although the plastic optical fiber has been described as an example of the optical fiber 13 in the above-described first embodiment, the optical fiber 13 applied to the optical collimator 10 according to the first embodiment is not limited to the plastic optical fiber. A glass optical fiber may also be applicable for a configuration in which the end face on the collimator lens 12 side is disposed on the same plane.

Moreover, although the glass optical fiber has been described as an example of the optical fiber 15 in the above-described second embodiment, the optical fiber 15 applied to the optical collimator 20 according to the second embodiment is not limited to the glass optical fiber. For example, a plastic optical fiber may also be applicable for a configuration in which part of the end face on the collimator lens 12 side is disposed so as to protrude. For example, such a plastic optical fiber may be applicable to a case where a coating layer with which the circumference of a clad is coated is formed and only the core and clad are disposed so as to protrude from the end face of the coating layer.

Moreover, although a case has been described in the above-described first embodiment where the holder 11 has a generally cylindrical shape, the configuration of the holder 11 is not limited to the cylindrical shape, but can be changed as appropriate. Any given shape may be adopted on condition that the accommodation section 11c of the collimator lens 12 is formed at one end portion, and on the other hand, the insertion hole 11a of the optical fiber 13 is formed at the other end portion. For example, a rectangular cylindrical shape (that is, cylindrical shape whose cross section orthogonal to the insertion direction of the optical fiber 13 is rectangular) may be included therein.

If, for example, the rectangular cylindrical holder 11 is applied to the optical collimator 10 according to the first embodiment, a plurality of recesses 11e are provided on the same plane orthogonal to the insertion direction of the optical fiber 13 on the inner surface of the holder 11. The same applies to the recess 11f when applied to the optical collimator 20 according to the second embodiment. When the rectangular cylindrical holder 11 is applied to the optical collimator 30 according to the third embodiment, the recess 11g is provided in a ring shape on the same plane orthogonal to the insertion direction of the optical fiber 13 on the inner surface of the holder 11.

Moreover, a case has been described in the above-described embodiments where the present invention is embodied as the optical collimator 10 (20, 30) and the optical connector connected thereto. However, the present invention is not limited to these cases, and the present invention is also applicable as an optical coupling member holding member made up of the holder 11 included in the above-described optical collimator 10 (20, 30). In this case, the optical coupling member holding member is provided with, for example, a holding body configured of the entire holder 11, the accommodation section 11c provided at one end of the holding body to accommodate the lens (e.g., collimator lens 12 in the case of the optical collimator holding member), the insertion hole 11a provided at the other end of the holding body to insert the optical fiber 13 (15), and abutting surfaces $11e_1$ and $11e_2$ (abutting surfaces $11f_1$ and $11f_2$, abutting surfaces $11g_1$ and $11g_2$) formed in the vicinity of the accommodation section 11c by providing the recess 11e (recess 11f, recess 11g) on the circumference in the vicinity of the accommodation section 11c of the holding body to perform positioning by causing at least one of the end faces of the lens and optical fiber 13 (15) to come into contact therewith.

The optical coupling member holding member according to the present invention provides the abutting surfaces $11e_1$ and $11e_2$ (abutting surfaces $11f_1$ and $11f_2$, abutting surfaces $11g_1$ and $11g_2$) for performing positioning by causing at least one of the lens and the optical fiber 13 (15) to come into contact with part of the recess 11e (11f, 11g) provided in the vicinity of the accommodation section 11c, and can thereby position the lens and/or the optical fiber 13 (15) using the recess 11e (11f, 11g) as a reference. This makes it possible to improve operation efficiency compared to conventional cases where a spacer as a separate member is inserted in the holding member and where a spacer portion is provided in the holding member itself. As a result, it is possible to simply position the lens and the optical fiber 13 (15) while suppressing an increase in cost.

The present application is based on Japanese Patent Application No. 2011-212867 filed on Sep. 28, 2011 and Japanese Patent Application No. 2011-229140 filed on Oct. 18, 2011, entire content of which is expressly incorporated by reference herein.

The invention claimed is:

1. An optical coupling member comprising:
an optical fiber;
a holding member that holds the optical fiber inserted from an insertion hole formed at one end; and
a lens accommodated in an accommodation section formed at the other end of the holding member,
wherein the holding member includes a recess formed in an outer peripheral surface of the holding member near the accommodation section, and the optical coupling member performs positioning by causing at least one of the lens and an end face of the optical fiber to come into contact with an abutting surface formed by the recess, and
wherein a plurality of the recesses are provided on an identical plane orthogonal to an insertion direction of the optical fiber.

2. The optical coupling member according to claim 1, wherein an angle of the abutting surface facing the optical fiber is set to 20° or less with respect to the plane orthogonal to the insertion direction of the optical fiber and part of the end face of the optical fiber is caused to come into contact with the abutting surface.

3. The optical coupling member according to claim 1, wherein an angle of the abutting surface facing the optical fiber is set to 30° or more and 80° or less with respect to the plane orthogonal to the insertion direction of the optical fiber and part of a reinforcing layer making up the optical fiber is caused to come into contact with the abutting surface and a core and an end face of a clad making up the optical fiber are arranged closer to the lens side than the abutting portion.

4. The optical coupling member according to claim 2, wherein the angle of the abutting surface facing the optical fiber is made to differ from the angle of the abutting surface facing the lens with respect to the plane orthogonal to the insertion direction of the optical fiber.

5. The optical coupling member according to claim 1, wherein the abutting surface facing the lens is made up of an inclined plane, the angle of the inclined plane with respect to the plane orthogonal to the insertion direction of the optical fiber is set to 0° or more and 45° or less and part of the lens is caused to come into contact with the inclined plane.

6. The optical coupling member according to claim 1, wherein removal processing is applied to the abutting surface facing the lens.

7. An optical connector comprising the optical coupling member according to claim 1 connected thereto.

8. An optical coupling member holding member comprising:
- a holding body that holds an optical fiber;
- an accommodation section provided at one end of the holding body for accommodating a lens; and
- an insertion hole provided at the other end of the holding body for inserting the optical fiber,
- wherein the holding body includes a recess formed in an outer peripheral surface of the holding body near the accommodation section, and the optical coupling member holding member performs positioning by causing at least one of the lens and an end face of the optical fiber to come into contact with an abutting surface formed by the recess, and
- wherein a plurality of the recesses are provided on an identical plane orthogonal to an insertion direction of the optical fiber.

9. The optical coupling member holding member according to claim 8, wherein an angle of the abutting surface facing the optical fiber inserted via the insertion hole is set to 20° or less with respect to the plane orthogonal to the insertion direction of the optical fiber.

10. The optical coupling member holding member according to claim 8, wherein an angle of the abutting surface facing the optical fiber inserted via the insertion hole is set to 30° or more and 80° or less with respect to the plane orthogonal to the insertion direction of the optical fiber.

11. The optical coupling member holding member according to claim 9, wherein the angle of the abutting surface facing the optical fiber inserted via the insertion hole is made to differ from the angle of the abutting surface facing the lens accommodated in the accommodation section with respect to the plane orthogonal to the insertion direction of the optical fiber.

12. The optical coupling member holding member according to claim 8, wherein:
- the abutting surface facing the lens accommodated in the accommodation section is made up of an inclined plane, and
- the angle of the inclined plane with respect to the plane orthogonal to the insertion direction of the optical fiber is set to 0° or more and 45° or less.

13. The optical coupling member holding member according to claim 8, wherein removal processing is applied to the abutting surface facing the lens accommodated in the accommodation section.

14. The optical coupling member according to claim 3, wherein the angle of the abutting surface facing the optical fiber is made to differ from the angle of the abutting surface facing the lens with respect to the plane orthogonal to the insertion direction of the optical fiber.

15. The optical coupling member holding member according to claim 10, wherein the angle of the abutting surface facing the optical fiber inserted via the insertion hole is made to differ from the angle of the abutting surface facing the lens accommodated in the accommodation section with respect to the plane orthogonal to the insertion direction of the optical fiber.

* * * * *